(12) United States Patent
Seo et al.

(10) Patent No.: US 9,553,487 B2
(45) Date of Patent: Jan. 24, 2017

(54) RADIAL AND AXIAL FLUX MOTOR USING INTEGRATED WINDINGS

(71) Applicant: KOREA ELECTRONICS TECHNOLOGY INSTITUTE, Seongnam-si, Gyeonggi-do (KR)

(72) Inventors: Jungmoo Seo, Goyang-si (KR); Sehyun Rhyu, Bucheon-si (KR); Insoung Jung, Seoul (KR); Youngkyoun Kim, Seoul (KR); Jeongjong Lee, Incheon (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 322 days.

(21) Appl. No.: 14/016,864

(22) Filed: Sep. 3, 2013

(65) Prior Publication Data
US 2014/0285048 A1    Sep. 25, 2014

(30) Foreign Application Priority Data

Mar. 20, 2013   (KR) .................. 10-2013-0029899

(51) Int. Cl.
  *H02K 1/27*     (2006.01)
  *H02K 21/12*    (2006.01)
  (Continued)

(52) U.S. Cl.
  CPC ............ *H02K 1/2786* (2013.01); *H02K 1/27* (2013.01); *H02K 1/2793* (2013.01); *H02K 3/47* (2013.01);
  (Continued)

(58) Field of Classification Search
  CPC ...... H02K 1/27; H02K 1/2786; H02K 1/2793; H02K 21/12; H02K 3/47
  (Continued)

(56) References Cited

U.S. PATENT DOCUMENTS 4,327,304 A  *  4/1982  Aoki ............................ 310/266
4,553,058 A  *  11/1985  Iwasaki .................... H02K 3/04
                                                           29/598

(Continued)

FOREIGN PATENT DOCUMENTS

| JP | 06245462    | 9/1994 |
| JP | 2005080358 A | 3/2005 |
| JP | 2005237086 A | 9/2005 |

OTHER PUBLICATIONS

Korean Office Action for application No. 10-2013-0029899 dated Feb. 25, 2014.

(Continued)

*Primary Examiner* — Terrance Kenerly
*Assistant Examiner* — Rashad Johnson
(74) *Attorney, Agent, or Firm* — Hauptman Ham, LLP

(57) ABSTRACT

The present disclosure relates to a radial and axial flux motor using integrated windings, which includes a rotor which includes a rotor core having a shape of a hollow cylindrical case, and permanent magnets for an inner lateral surface and permanent magnets for a ceiling surface that are coupled to the inner lateral surface and the ceiling surface of the rotor core respectively, and which is rotated about a shaft, and a stator which includes a stator core and windings coupled to the stator core and which is installed in the rotor. Therefore, a radial flux motor and an axial flux motor are integrated into one motor to be able to increase both efficiency and output.

18 Claims, 11 Drawing Sheets

(51) Int. Cl.
*H02K 3/47* (2006.01)
*H02K 21/22* (2006.01)
*H02K 21/24* (2006.01)

(52) U.S. Cl.
CPC .............. *H02K 21/12* (2013.01); *H02K 21/22* (2013.01); *H02K 21/24* (2013.01); *H02K 2201/03* (2013.01)

(58) Field of Classification Search
USPC ........... 310/114, 156.12, 179, 198, 216, 265, 310/268, 49.42
See application file for complete search history.

(56) References Cited

U.S. PATENT DOCUMENTS

| | | | |
|---|---|---|---|
| 4,604,540 A * | 8/1986 | Fukami | 310/154.06 |
| 4,644,209 A | 2/1987 | Nozawa | |
| RE33,628 E * | 7/1991 | Hahn | H02K 23/54 310/154.06 |
| 5,831,365 A * | 11/1998 | Keim | H02K 1/2786 29/596 |
| 5,894,902 A | 4/1999 | Cho | |
| 6,617,748 B2 * | 9/2003 | Dunn | 310/268 |
| 6,762,525 B1 * | 7/2004 | Maslov | H02K 1/182 310/112 |
| 6,940,206 B2 * | 9/2005 | Asaba | H02K 3/47 310/154.05 |
| 7,755,244 B2 | 7/2010 | Ley et al. | |
| 2006/0066169 A1 * | 3/2006 | Daugherty | H02K 1/06 310/216.016 |
| 2008/0278020 A1 * | 11/2008 | Ley et al. | 310/156.36 |
| 2011/0241460 A1 * | 10/2011 | Mebarki | H02K 1/20 310/64 |
| 2011/0273050 A1 * | 11/2011 | Chien et al. | 310/181 |
| 2011/0298327 A1 * | 12/2011 | Holmes | H02K 21/145 310/195 |

OTHER PUBLICATIONS

Korean Office Action for application No. 10-2013-0029899 dated Aug. 6, 2014.

* cited by examiner

RADIAL AND AXIAL FLUX MOTOR USING INTEGRATED WINDINGS

CROSS-REFERENCE TO RELATED APPLICATION

This application claims priority to and benefit of Patent Application Serial No. 10-2013-0029899, filed on Mar. 20, 2013 in Korea, which is hereby incorporated by reference herein in its entirety.

TECHNICAL FIELD

The present disclosure relates to a motor and, more particularly, to a radial and axial flux motor using integrated windings in which torque is produced both in radial and axial directions, and thereby a rotational force and an output can be increased.

BACKGROUND

A motor refers to an apparatus that uses a principle that a force is produced in a direction perpendicular to magnetic flux produced from a permanent magnet and electric current flowing through a conductor when the magnetic flux is perpendicular to a direction of the electric current, and converts this force into a rotational force.

This motor generally includes windings that are conductors conducting electricity, a stator including permanent magnets, a rotor converting electric energy supplied to the stator into mechanical energy, a shaft serving to support the rotor, and a bearing allowing the rotor and the shaft to be smoothly and constantly rotated.

This motor may be classified as a radial flux motor or an axial flux motor on the basis of a direction of the magnetic flux emitted from the permanent magnets.

The radial flux motor is configured so that permanent magnets mounted in a radial direction serves as the rotor, and windings for producing a magnetic field in a radial direction and a core to which a magnetic force from the permanent magnets is applied serve as the stator. With this configuration, the magnetic field produced by interaction of the permanent magnets and the windings is transmitted to the core so as to be able to generate a rotational force. This radial flux motor may be provided with a pulling plate in order to produce a preload for supporting the shaft on the bearing.

In contrast, the axial flux motor is configured so that windings producing a magnetic force in an axial direction are fixed to the stator and permanent magnets mounted in the axial direction are fixed to the rotor. A rotational force can be produced by interaction of the windings and the permanent magnets.

In the case of the aforementioned radial flux motor, since the permanent magnets are mounted so as to produce the magnetic field only in the radial direction, there is a limitation that an axial magnetic force is weak, and thus an axial preload is required for the bearing in order to axially support the rotor that is rotated. In contrast, in the axial flux motor, there is a disadvantage in that a greater axial magnetic force than needed is produced due to the permanent magnets mounted in the axial direction.

SUMMARY

Accordingly, the present invention has been made keeping in mind the above problems occurring in the related art, and an object of the present invention is to provide a radial and axial flux motor using integrated windings in which a radial flux motor and an axial flux motor are incorporated into one motor, and thus two types of motors can be integrated into one motor.

Another object of the present invention is to provide a radial and axial flux motor using integrated windings, capable of increasing both efficiency and output.

In addition, another object of the present invention is to provide a radial and axial flux motor using integrated windings, capable of reducing the overall losses of the motor such as a copper loss, an iron loss, a windage loss, and a frictional loss and thus consumed power.

In accordance with some embodiments, a radial and axial flux motor using integrated windings includes a rotor which includes a rotor core having a shape of a hollow cylindrical case, lateral permanent magnets coupled to an inner lateral surface of the rotor core, and ceiling permanent magnets coupled to a ceiling surface of the rotor core, and which is rotated about a shaft, and a stator which includes a stator core and windings coupled to the stator core and which is installed in the rotor.

Here, the stator may include the stator core having a shape of a hollow cylindrical case, and the integrated windings that correspond to both radial magnetic flux and axial magnetic flux which are produced respectively from the lateral and ceiling permanent magnets and are perpendicular to each other.

Further, the lateral permanent magnets and the ceiling permanent magnets are formed integrally or separately, and may be disposed so that, in connection with polarities thereof, N and S poles alternate with each other or the same poles face each other.

Further, the rotor core may be a stacked type or a soft magnetic composite type.

Further, the stator core may be a stacked type or a soft magnetic composite type, or use a non-magnetic substance only to support the integrated windings.

In addition, the integrated windings may include lateral windings corresponding to the lateral permanent magnets and ceiling windings corresponding to the ceiling permanent magnets, the lateral and ceiling windings being formed integrally or separately.

Here, each integrated winding may include protrusions formed at a boundary between the lateral winding and the ceiling winding in order to facilitate a process of bending the integrated winding at right angles.

Further, the integrated windings may be coupled to the stator core in an overlapping state.

According to the present disclosure, a radial flux motor and an axial flux motor are incorporated into one motor, and thus two types of motors can be integrated into one motor.

Further, since a rotational force can be produced using both the radial magnetic flux and the axial magnetic flux that are perpendicular to each other, both efficiency and output of the motor can be increased.

In addition, the overall losses of the motor such as a copper loss, an iron loss, a windage loss, and a frictional loss can be reduced using both the radial magnetic flux and the axial magnetic flux that are perpendicular to each other, and thus consumed power can be reduced.

DETAILED DESCRIPTION

Figure 1:
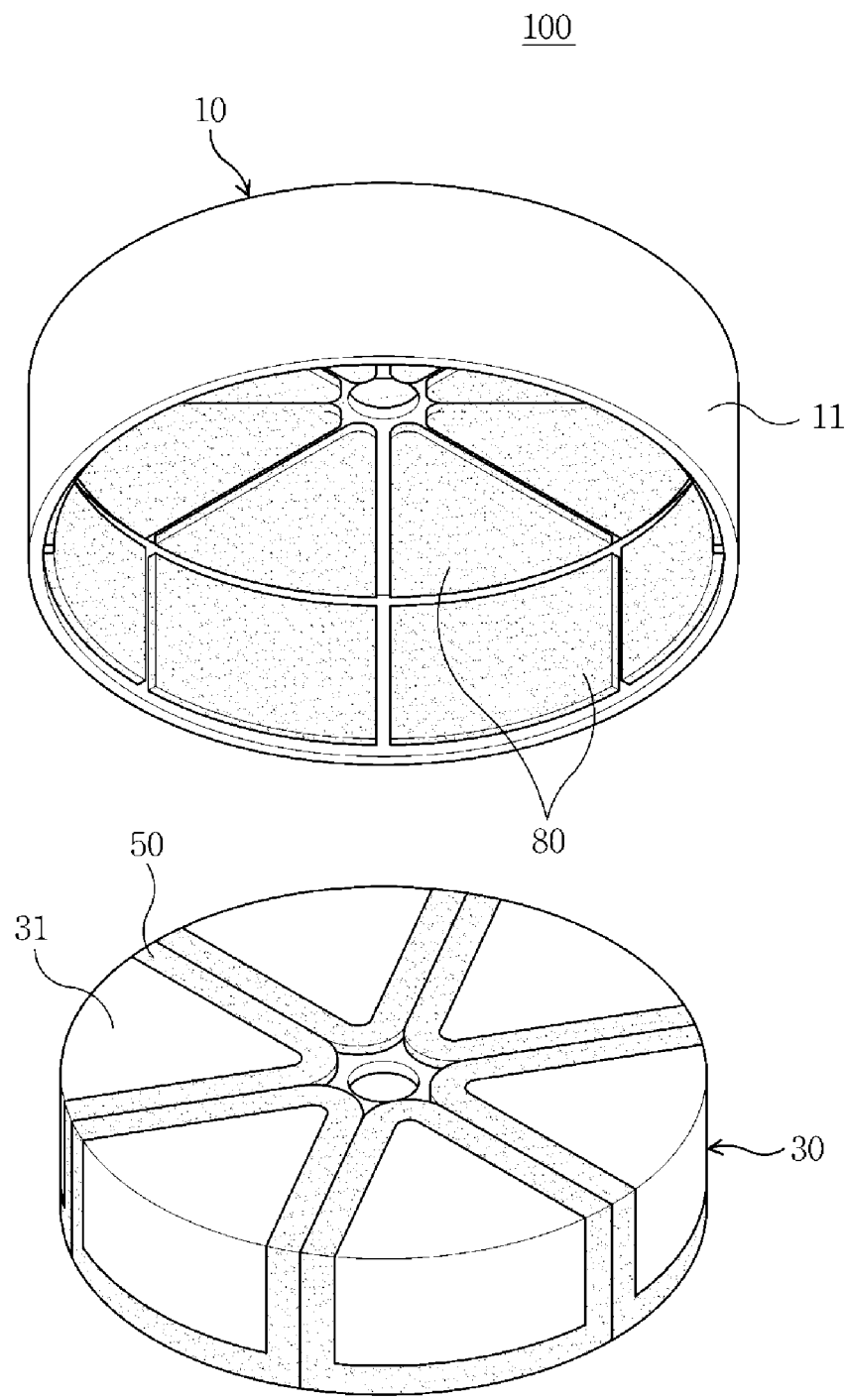
FIG. 1 is an exploded perspective view showing a radial and axial flux motor using integrated windings in accordance with a first embodiment of the present disclosure.

In the following description, numerous specific details are set forth. However, it is understood that various embodiments of the disclosure are practiced without these specific details. In other instances, well-known functions or configurations are not shown in detail in order not to obscure understanding of this description. The same reference numbers will be used throughout this specification to refer to the same or like parts.

The terms or words used in the specification and claims are not to be interpreted by their typical or dictionary meanings but their meanings and concepts should be construed in conformity with the technical idea of the present disclosure, based on the principle that the inventor can properly define the concepts of the terms so as to explain the present disclosure in the best manner. Accordingly, the embodiments described in the specification and the configurations shown in the drawings are no more than the most preferred embodiment of the present disclosure, and do not represent the technical idea of the present disclosure. Therefore, it should be understood that a variety of equivalents and modifications can be made at the time of filing the present disclosure.

Figure 2:
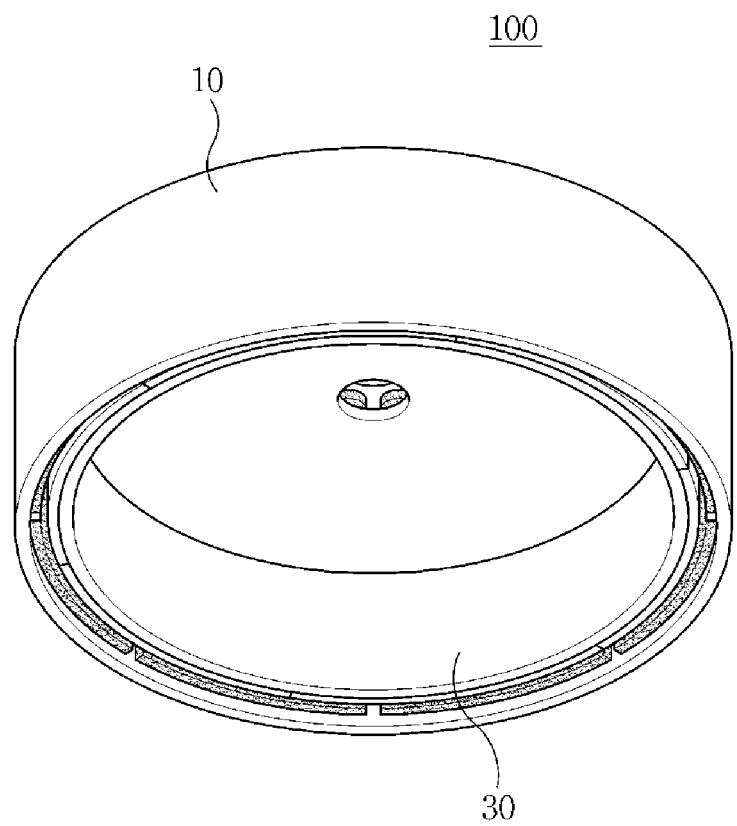
FIG. 2 is a perspective view showing the radial and axial flux motor in accordance with the first embodiment of the present disclosure.
Figure 3:
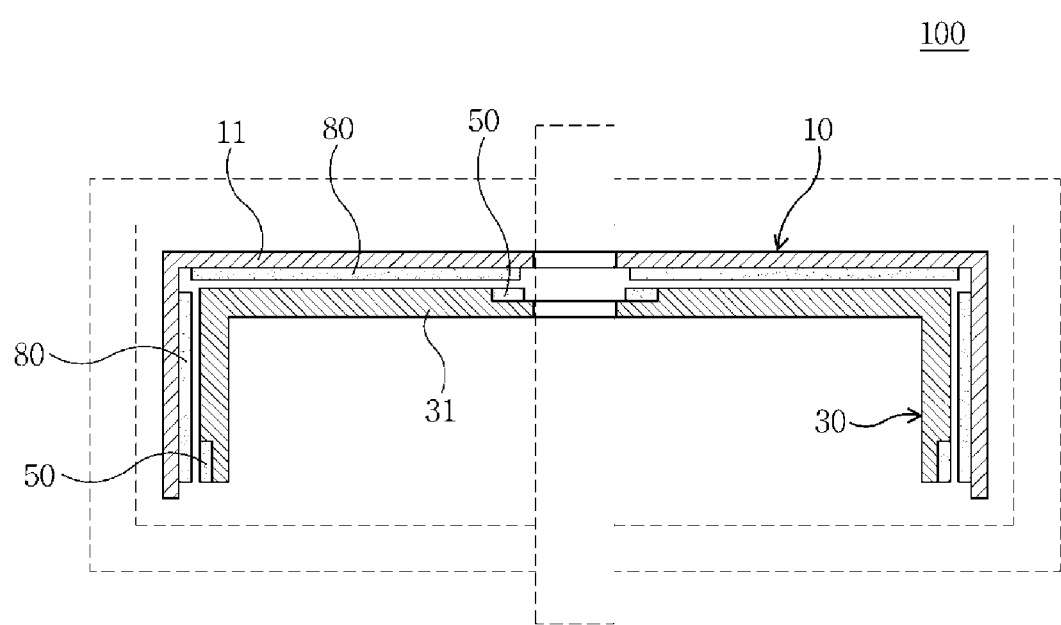
FIG. 3 is a cross-sectional view showing the radial and axial flux motor in accordance with the first embodiment of the present disclosure.

FIG. 1 is an exploded perspective view showing a radial and axial flux motor using integrated windings in accordance with a first embodiment of the present disclosure. FIG. 2 is a perspective view showing the radial and axial flux motor in accordance with the first embodiment of the present disclosure. FIG. 3 is a cross-sectional view showing the radial and axial flux motor in accordance with the first embodiment of the present disclosure.

As shown in FIGS. 1 to 3, the radial and axial flux motor 100 using integrated windings in accordance with a first embodiment of the present disclosure includes a rotor 10, a stator 30, integrated windings 50, and permanent magnets 80.

The rotor 10 is made up of a rotor core 11 and the permanent magnets 80. The permanent magnets 80 producing magnetic flux for driving the motor are coupled to an inner lateral surface and a ceiling surface of the rotor core 11 (hereinafter, the permanent magnets coupled to the inner lateral surface of the rotor core will be referred to as lateral permanent magnets, and the permanent magnets coupled to the ceiling surface of the rotor core will be referred to as ceiling permanent magnets). The rotor core 11 may have the shape of a hollow cylindrical case receiving radial magnetic flux and axial magnetic flux, which are produced from the permanent magnets 80 in perpendicular directions to each other because the inner lateral surface and the ceiling surface are formed at right angles to each other.

The stator 30 is made up of a stator core 31 and the integrated windings 50. The integrated windings 50 are coupled to the stator core 31 having the shape of a hollow cylindrical case so as to be able to correspond to the radial and axial magnetic fluxes produced from the permanent magnets 80 mounted on the rotor 10 in the perpendicular direction to each other, and are coupled in the rotor 10.

Figure 4:
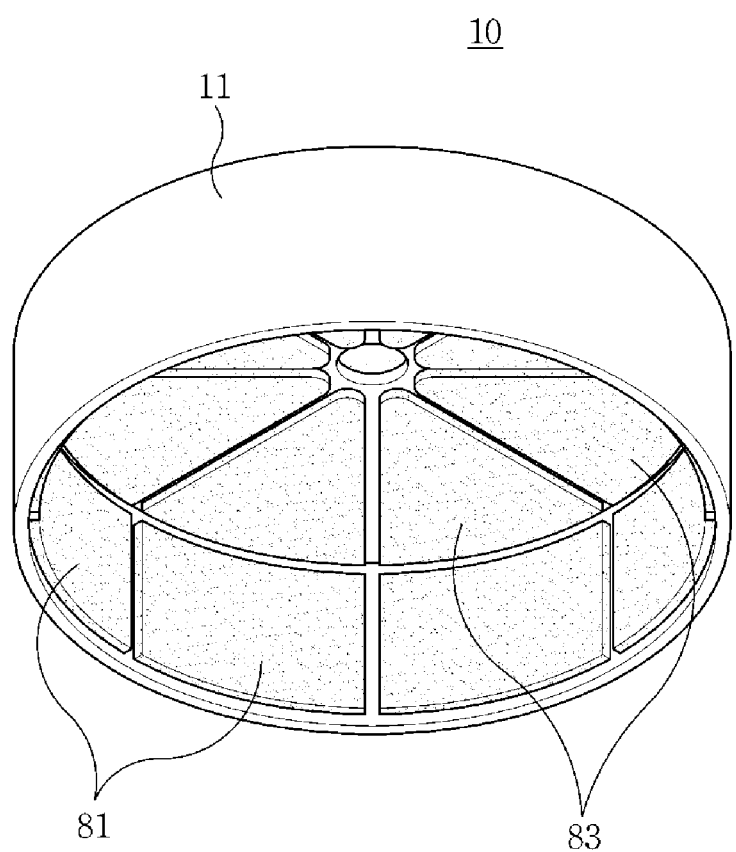
FIG. 4 is a perspective view showing a rotor to which permanent magnets for an inner lateral surface and permanent magnets for a ceiling surface are coupled in accordance with the first embodiment of the present disclosure.

FIG. 4 is a perspective view showing a rotor to which the lateral permanent magnets 81 and the ceiling permanent magnets 83 are coupled in accordance with the first embodiment of the present disclosure.

As shown in FIG. 4, the permanent magnets 80 are divided into the lateral permanent magnets 81 and the ceiling permanent magnets 83 so as to be able to produce the magnetic flux in the radial and axial directions perpendicular to each other, and are coupled to the inner lateral surface and the ceiling surface of the rotor core 11, respectively.

Since the rotor core 11 has a circular cross section, and the ceiling permanent magnets 83 have a fan shape, the number of permanent magnets 80 coupled to the rotor core 11 may be determined depending on a central angle of the fan shape. In detail, when the central angle of the fan shape is defined as "a," the number of the ceiling permanent magnets 83 is $2\pi/a$. The lateral permanent magnets 81 have a rectangular shape and the same number as the number of the ceiling permanent magnets 83. Further, the lateral permanent magnets 81 and the ceiling permanent magnets 83 may be installed in a plurality of pairs. The lateral permanent magnets 81 and the ceiling permanent magnets 83 equally divide the inner lateral surface and the ceiling surface, respectively.

Further, the rotor core 11 may be a stacked type or a soft magnetic composite (SMC) type.

Figure 5:
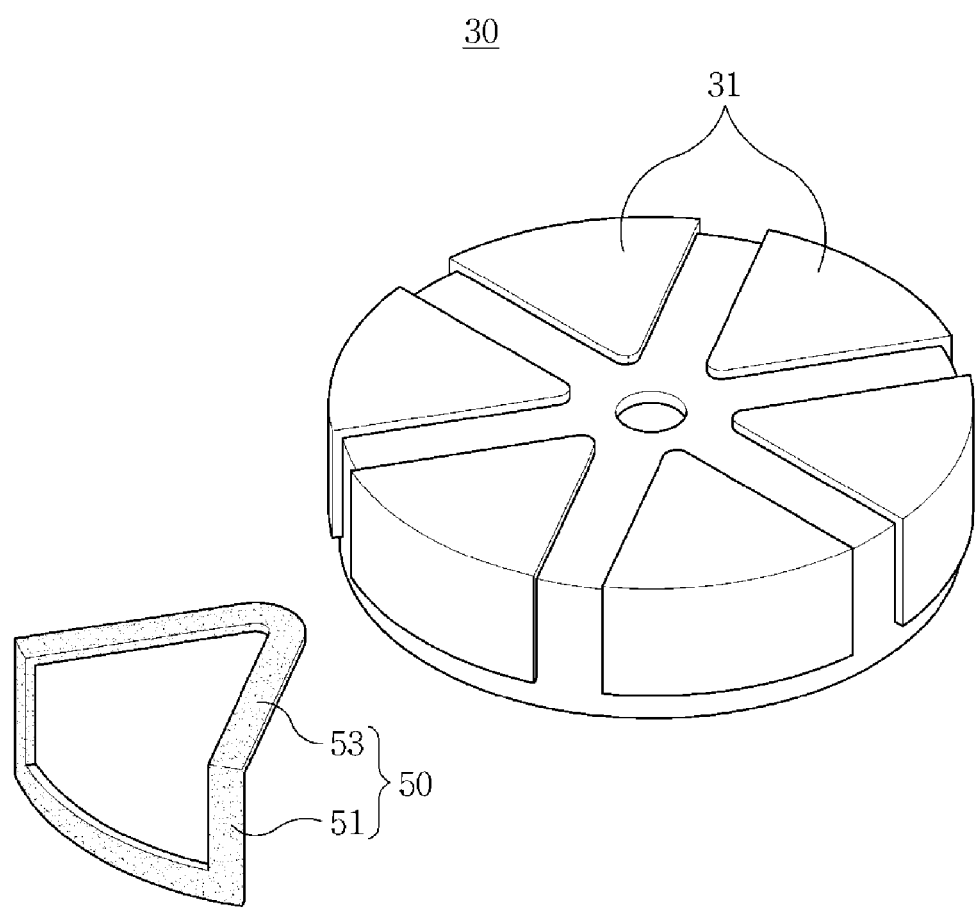
FIG. 5 is an exploded perspective view showing a stator made up of integrated windings and a stator core in accordance with the first embodiment of the present disclosure.
Figure 6:
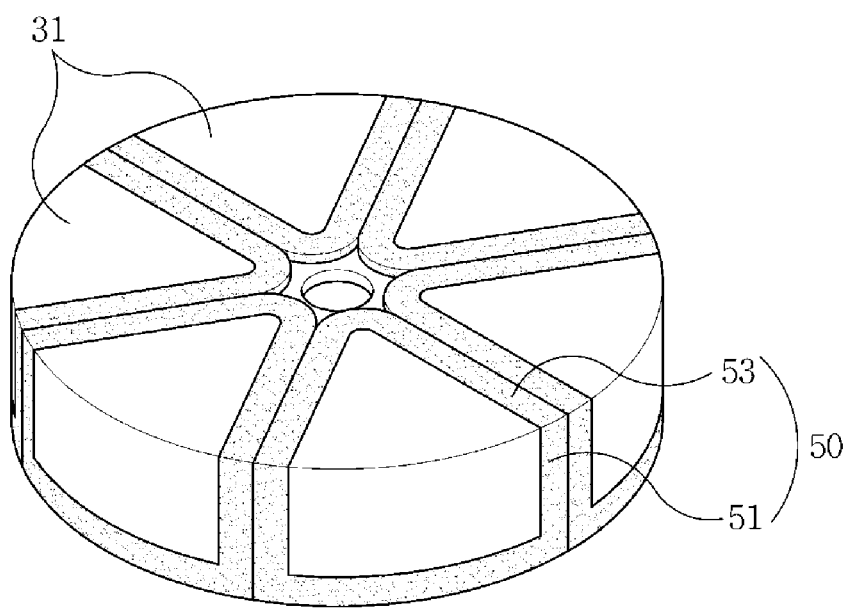
FIG. 6 is a perspective view showing the stator made up of the integrated windings and the stator core in accordance with the first embodiment of the present disclosure.

FIG. 5 is an exploded perspective view showing a stator 30 made up of integrated windings 50 and a stator core 31 in accordance with the first embodiment of the present disclosure. FIG. 6 is a perspective view showing the stator 30 made up of the integrated windings 50 and the stator core 31 in accordance with the first embodiment of the present disclosure.

As shown in FIGS. 5 and 6, the integrated windings 50 are divided into windings 51 for the inner lateral surface and windings 53 for the ceiling surface (hereinafter, the former will be referred to as lateral windings, and the latter will be referred to as ceiling windings), correspond to both the radial magnetic flux and the axial magnetic flux that are the perpendicular directions to each other, and are coupled to the stator core 31.

Since the stator core 31 has a circular cross section, and the ceiling windings 53 have a fan shape, the number of integrated windings 50 coupled to the stator core 31 may be determined depending on a central angle of the fan shape. In detail, when the central angle of the fan shape is defined as "b," the number of the ceiling windings 53 is 2π/b. The lateral windings 51 have a rectangular shape and the same number as the number of the ceiling windings 53. Further, the lateral windings 51 and the ceiling windings 53 may be installed in a plurality of pairs. The lateral windings 51 and the ceiling windings 53 equally divide the inner lateral surface and the ceiling surface, respectively.

Further, the integrated windings 50 are coupled to the stator core 31 in sufficiently close contact with the stator core 31 in order to maintain an air gap, so that the integrated windings 50 do not protrude to the outside. To this end, the stator core 31 may be provided with slots at portions to which the integrated windings 50 are coupled.

In addition, the stator core 31 may be a stacked type or an SMC type. A non-magnetic substance such as plastic may be used for the stator core 31 to support only the integrated windings 50.

Figure 7:
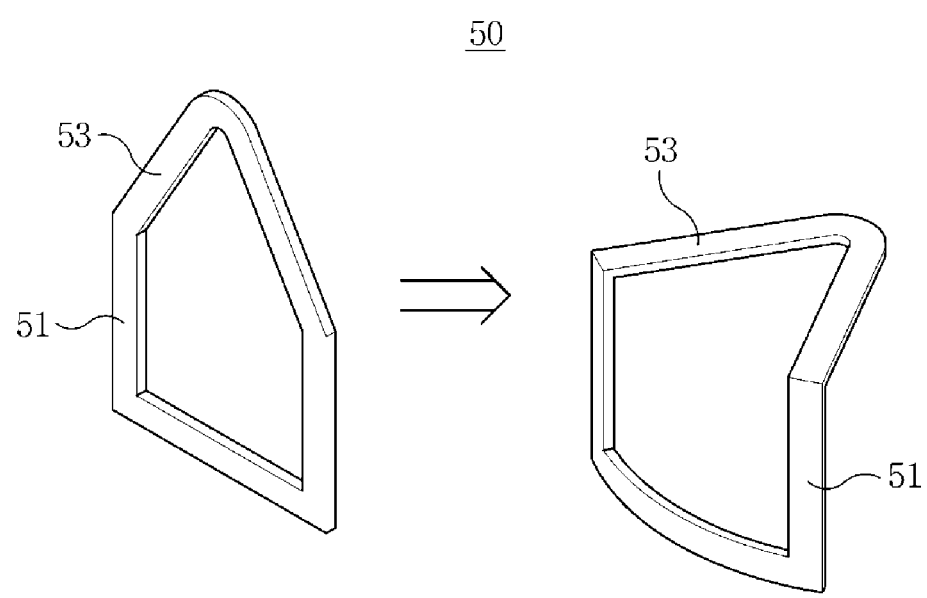
FIG. 7 is a perspective view showing an integrated winding in which a winding for an inner lateral surface and a winding for a ceiling surface are formed in one body in accordance with the first embodiment of the present disclosure.

FIG. 7 is a perspective view showing an integrated winding in which the lateral winding 51 and the ceiling winding 53 are formed in one body in accordance with the first embodiment of the present disclosure.

As shown in FIG. 7, the integrated winding 50 according to the first embodiment is bent at a boundary between the lateral winding 51 and the ceiling winding 53 at right angles so as to be able to correspond to the radial magnetic flux and the axial magnetic flux that are perpendicular to each other.

The integrated windings 50 may have the shape of a concentrated winding in which the windings are concentrated on one slot or a distributed winding in which the windings are distributed to numerous slots.

Figure 8:
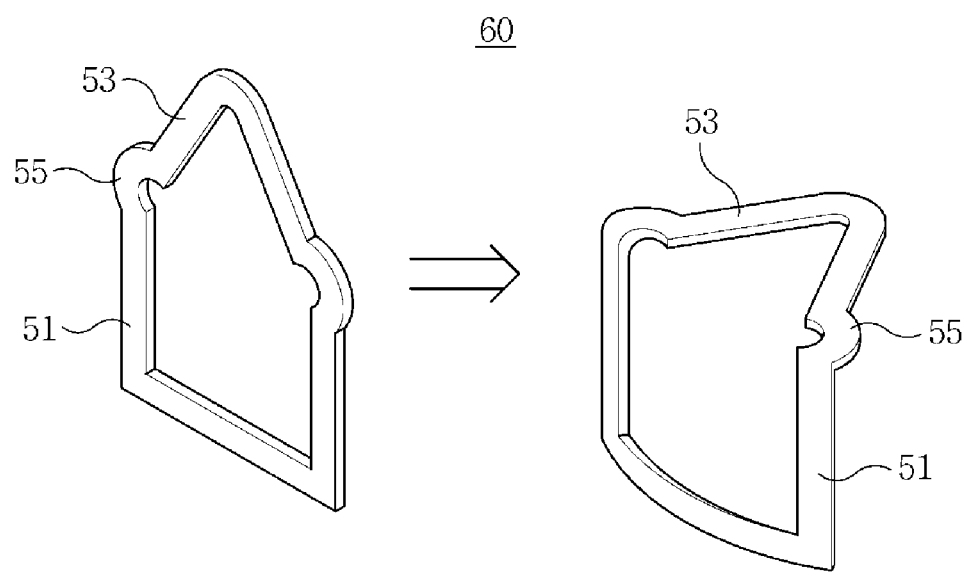
FIG. 8 is a perspective view showing an integrated winding in which a winding for an inner lateral surface and a winding for a ceiling surface are formed in one body and which includes protrusions in accordance with a second embodiment of the present disclosure.

FIG. 8 is a perspective view showing an integrated winding 60 in which the lateral winding 51 and the ceiling winding 53 are formed in one body and which includes protrusions 55 in accordance with a second embodiment of the present disclosure.

As shown in FIG. 8, the integrated winding 60 is bent at a boundary between the lateral winding 51 and the ceiling winding 53 at right angles so as to be able to induce both the radial magnetic flux and the axial magnetic flux that are perpendicular to each other. To facilitate a process of bending the integrated winding at right angles, protrusions 55 may be provided at the boundary.

The protrusions 55 according to the second embodiment protrude outward from the integrated winding 60. However, it is apparent to those having ordinary skill in the art that the protrusions 55 may also protrude inward from the integrated winding 60.

Figure 9:
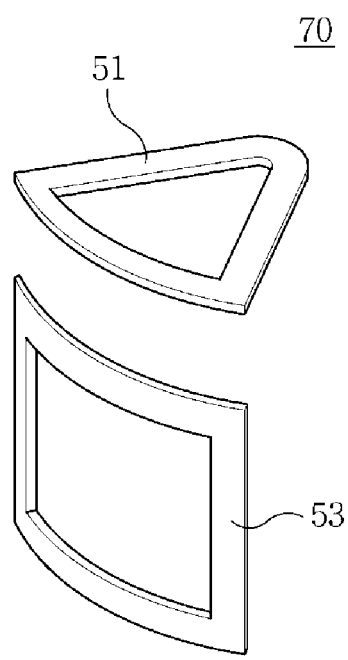
FIG. 9 is a perspective view showing an integrated winding in which a winding for an inner lateral surface and a winding for a ceiling surface are separated from each other in accordance with a third embodiment of the present disclosure.

FIG. 9 is a perspective view showing an integrated winding 70 in which the lateral winding 51 and the ceiling winding 53 are separated from each other in accordance with a third embodiment of the present disclosure.

As shown in FIG. 9, the lateral winding 51 and the ceiling winding 53 need only be disposed at right angles so as to be able to correspond to the radial magnetic flux and the axial magnetic flux that are perpendicular to each other. As such, it is apparent to those having ordinary skill in the art that the windings are not essentially required to be formed in one body.

Figure 10:
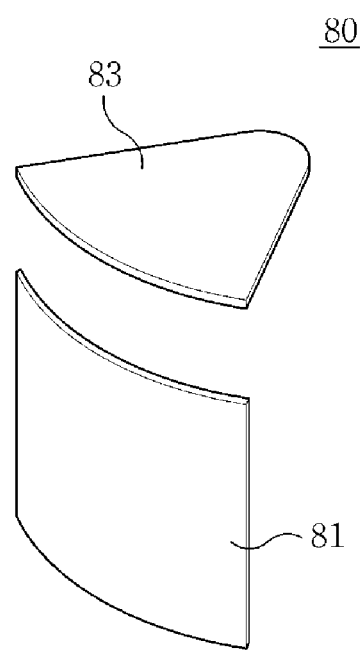
FIG. 10 is a perspective view showing a permanent magnet in which a permanent magnet for an inner lateral surface and a permanent magnet for a ceiling surface are separated from each other in accordance with the first embodiment of the present disclosure.

FIG. 10 is a perspective view showing a permanent magnet 80 in which the lateral permanent magnet 81 and the ceiling permanent magnet 83 are separated from each other in accordance with the first embodiment of the present disclosure.

As shown in FIG. 10, the permanent magnet 80 may be disposed so that, in connection with polarities of the lateral permanent magnet 81 and the ceiling permanent magnet 83, N and S poles alternate with each other or the same poles face each other.

Figure 11:
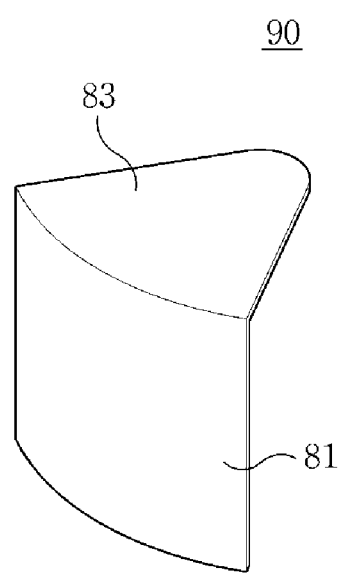
FIG. 11 is a perspective view showing a permanent magnet in which a permanent magnet for an inner lateral surface and a permanent magnet for a ceiling surface are formed in one body in accordance with a fourth embodiment of the present disclosure.

FIG. 11 is a perspective view showing a permanent magnet 90 in which the lateral permanent magnet 81 and the ceiling permanent magnet 83 are formed in one body in accordance with a fourth embodiment of the present disclosure.

As shown in FIG. 11, since the lateral permanent magnet 81 and the ceiling permanent magnet 83 need only be disposed at right angles so as to be able to produce the radial magnetic flux and the axial magnetic flux that are perpendicular to each other, the permanent magnet 90 need not be configured so that the lateral permanent magnet 81 and the ceiling permanent magnet 83 are essentially separated from each other. Thus, it is apparent to those having ordinary skill in the art that the permanent magnets may be formed in one body as in the fourth embodiment.

Likewise, the permanent magnet 90 according to the fourth embodiment may be disposed so that, in connection with polarities of the lateral permanent magnet 81 and the ceiling permanent magnet 83, N and S poles alternate with each other or the same poles face each other.

While this specification contains many implementation details, these should not be construed as limitations on the scope of the disclosure or of what can be claimed, but rather as descriptions of features specific to particular embodiments of the disclosure. Certain features that are described in this specification in the context of separate embodiments can be implemented in various implementations in combination in a single embodiment. Conversely, various features that are described in the context of a single embodiment can be implemented in various implementations in multiple embodiments separately or in any suitable sub-combination. Moreover, although features can be described above as acting in certain combinations and even initially claimed as such, one or more features from a claimed combination can in some cases be excluded from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results.

Meanwhile, the embodiments of the present disclosure which are disclosed in the specification and drawings merely suggest specific examples in order to help understanding, and are not intended to limit the scope of the present disclosure. Those skilled in the art will appreciate that, in addition to the disclosed embodiments, various modifications and variations can be made in the present disclosure without departing from the subject matter, the spirit and scope of the disclosure.

According to the present disclosure, since the radial magnetic flux and the axial magnetic flux are perpendicular to each other, a radial flux motor and an axial flux motor which have been manufactured can be integrated into one motor. Therefore, a rotational force can be produced using both the radial magnetic flux and the axial magnetic flux that are perpendicular to each other, and both efficiency and output can be increased by a single motor. In addition, the overall losses of the motor such as a copper loss, an iron loss, a windage loss, and a frictional loss can be reduced using both the radial magnetic flux and the axial magnetic flux that are perpendicular to each other, and thus consumed power can be reduced. This provides sufficient marketing or business possibility as well as industrial availability to be reliably carried out in reality.

What is claimed is:

1. A radial and axial flux motor, comprising:
   a rotor comprising:
     a rotor core having a shape of a first hollow cylindrical case;
     lateral permanent magnets coupled to an inner lateral surface of the rotor core; and
     ceiling permanent magnets coupled to a ceiling surface of the rotor core,
     wherein the rotor is configure to rotate about a shaft; and
   a stator comprising:
     a stator core; and
     a plurality of windings coupled to the stator core, and
   wherein the stator is disposed inside the rotor,
   wherein the plurality of windings comprise:
     lateral windings corresponding to the lateral permanent magnets; and
     ceiling windings corresponding to the ceiling permanent magnets,
   wherein the lateral and ceiling windings are formed integrally each other, and
   wherein the stator core has slots disposed at portions to which the winding for the inner lateral surface and the winding for the ceiling surface are coupled such that the winding for the inner lateral surface and the winding for the ceiling surface do not protrude from the stator core.

2. The radial and axial flux motor of claim 1, wherein the stator core has a shape of a second hollow cylindrical case,
   the plurality of windings is integrated with the stator and corresponds to both radial magnetic flux and axial magnetic flux, and
   the radial magnetic flux and axial magnetic flux are produced respectively from the lateral and ceiling permanent magnets and are perpendicular to each other.

3. The radial and axial flux motor of claim 2, wherein the windings comprises:
   lateral windings corresponding to the lateral permanent magnets; and
   ceiling windings corresponding to the ceiling permanent magnets,
   wherein the lateral and ceiling windings are separately formed.

4. The radial and axial flux motor of claim 1, wherein the lateral permanent magnets and the ceiling permanent magnets are formed integrally each other, and are disposed so that, in connection with polarities thereof, N and S poles alternate with each other.

5. The radial and axial flux motor of claim 1, wherein the rotor core is a stacked type.

6. The radial and axial flux motor of claim 1, wherein the stator core comprises a non-magnetic substance to support the windings.

7. The radial and axial flux motor of claim 1, wherein each of windings comprises first and second protrusions,
   the first side of the each of windings comprises a first lateral side and a first ceiling side,
   the second side of the each of windings comprises a second lateral side and a second ceiling side,
   the first protrusion is disposed between the first lateral side and the first ceiling side, and
   the second protrusion is disposed between the second lateral side and the second ceiling side.

8. The radial and axial flux motor of claim 7, wherein the first and second protrusions protrude toward inside the winding.

9. The radial and axial flux motor of claim 1, wherein the plurality of windings is coupled to the stator core in an overlapping state.

10. The radial and axial flux motor of claim 1, wherein the lateral permanent magnets and the ceiling permanent magnets are formed integrally each other, and are disposed so that, in connection with polarities thereof, the same poles face each other.

11. The radial and axial flux motor of claim 1, wherein the lateral permanent magnets and the ceiling permanent magnets are separately formed, and are disposed so that, in connection with polarities thereof, N and S poles alternate with each other.

12. The radial and axial flux motor of claim 1, wherein the lateral permanent magnets and the ceiling permanent magnets are separately formed, and are disposed so that, in connection with polarities thereof, the same poles face each other.

13. The radial and axial flux motor of claim 1, wherein the rotor core is a soft magnetic composite type.

14. A stator, comprising:
   a stator core having a shape of a hollow cylindrical case; and
   windings coupled to the stator core and corresponding to both radial magnetic flux and axial magnetic flux which are produced respectively from lateral and ceiling permanent magnets of a rotor which is separated from the stator and to be coupled with the stator on an outside of the stator,
   wherein
     the radial magnetic flux and axial magnetic flux are perpendicular to each other,
     the lateral permanent magnets are coupled to an inner lateral surface of a rotor core of the rotor,
     the ceiling permanent magnets are coupled to a ceiling surface of the rotor core of the rotor, and
   wherein the stator is disposed inside the rotor,
   wherein the plurality of windings comprise:
     lateral windings corresponding to the lateral permanent magnets; and
     ceiling windings corresponding to the ceiling permanent magnets,
   wherein the lateral and ceiling windings are formed integrally each other, and
   wherein the stator core has slots disposed at portions to which the winding for the inner lateral surface and the winding for the ceiling surface are coupled such that the winding for the inner lateral surface and the winding for the ceiling surface do not protrude from the stator core.

15. The stator of claim 14, wherein the stator core is a stacked type or a soft magnetic composite type, or comprises a non-magnetic substance to support the windings.

16. The stator of claim 14, wherein
- each of the windings comprises first and second protrusions,
- the first side of the each of windings comprises a first lateral side and a first ceiling side,
- the second side of the each of windings comprises a second lateral side and a second ceiling side,
- the first protrusion is disposed between the first lateral side and the first ceiling side, and
- the second protrusion is disposed between the second lateral side and the second ceiling side.

17. The stator of claim 16, wherein the first and second protrusions protrude toward inside the winding.

18. The stator of claim 14, wherein the windings are coupled to the stator core in an overlapping state.

\* \* \* \* \*